April 19, 1966   J. E. BURWELL   3,247,295
METHOD AND APPARATUS FOR PRODUCING A FOAMED
PLASTIC ARTICLE OF VARYING THICKNESSES
Filed July 17, 1963
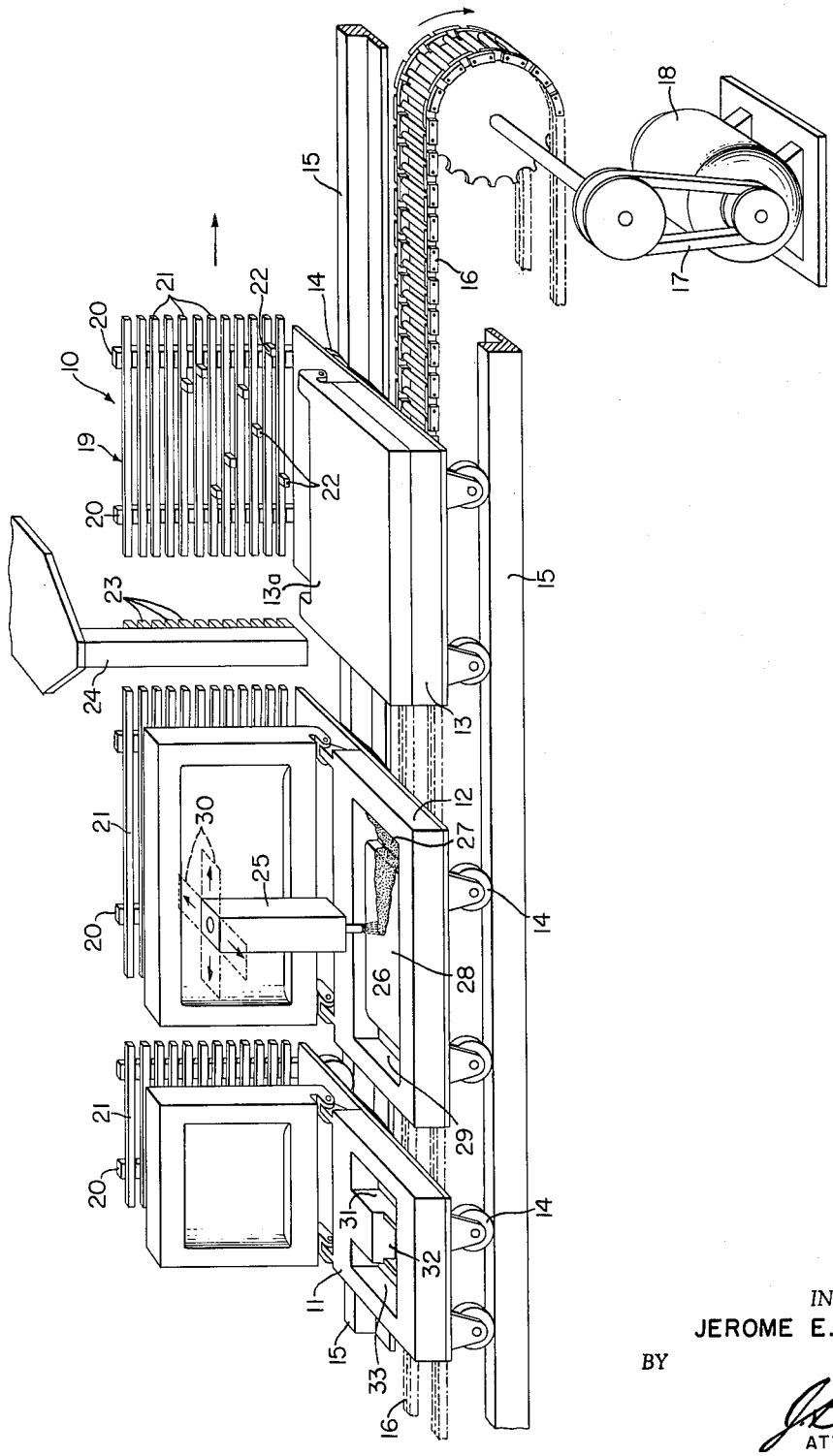
INVENTOR.
JEROME E. BURWELL
BY
*J.B. Holden*
ATTORNEY

United States Patent Office 3,247,295
Patented Apr. 19, 1966

3,247,295
METHOD AND APPARATUS FOR PRODUCING A FOAMED PLASTIC ARTICLE OF VARYING THICKNESSES
Jerome E. Burwell, Akron, Ohio, assignor to The Goodyear Tire & Rubber Company, Akron, Ohio, a corporation of Ohio
Filed July 17, 1963, Ser. No. 295,766
9 Claims. (Cl. 264—54)

This invention relates to a method and apparatus for the production of a plastic article. More specifically, it relates to the production of a porous foam article formed from a suitable resilient plastic material such as a foamable mixture of polyether glycol and polyisocyanate that is dispensed with a constant flow rate into a mold cavity having a variable rate of travel with respect to the dispensing apparatus.

In the manufacture of resilient articles such as foam seat cushions and automobile crash pads, it is common to mix ingredients such as polyether glycol, diisocyanate, water, proper accelerators, emulsifying agent and catalyst and place the mixture in a mold to form the desired shape or configuration of the finished product. The above-mentioned ingredients are commonly fed from their individual storage tanks to a mixing head where they are mechanically agitated and exit as a mixture capable of expanding into a foam having a volume many times that of the original mixture. Since the expansion of the catalyzed foam mixture occurs over a short time interval, special consideration must be given to the manner in which the unexpanded foam mixture is positioned within a mold. The ideal mold design would be one wherein the foam would be permitted to expand radially outward in all directions from a central point at which the required amount of foam preparation was placed in its entirety. From a practical standpoint the ideal conditions outlined above rarely occur; therefore, various means and methods must be devised in order to accommodate irregular sized and shaped molds. Also coupled with the problem of mold design is the introduction of the unexpanded foam in a uniform manner according to mold depth. The typical molded foam article has a cross section that varies in thickness and generally has a developed length several times its thickness.

Heretofore, it has been common to introduce a greater quantity foam material into the more reentrant or deeper sections of the mold than in the shallower mold portions. To accomplish this, the flow rate from the mixing nozzle had to be varied or more than one nozzle was required. The variable flow rate either required an increase of pressure throughout the entire system or necessitated as increased mixing rate. In either instance, the ensuing foam mixture did not lend itself well to the production of a homogeneous foam having a uniform cell size and a relatively constant density throughout.

It is, therefore, the primary object of this invention to provide a method and apparatus for the utilization of a constant flow of catalyzed foam mixture to charge a mold.

A further object of this invention is to regulate the movement of a mold with respect to constant flow foam dispensing apparatus so that the larger portions of the mold cavity receive a greater quantity of unexpanded catalyzed foam mixture than does the smaller portions of the mold.

Another object of the invention is to provide a foamed article having a more uniform density and cell size.

Further objects and advantages of the invention will be readily apparent from the following description when taken in conjunction with the drawings wherein the mechanical features are clearly shown. A portion of an automated production line for a foam product is shown at 10 in the sole drawing of this invention. The individual components associated with apparatus 10 are shown in block form in order that the inter-relationship therebetween can best be understood. Molds for producing various shaped elastomeric foam articles are illustrated at 11, 12 and 13. The molds are supported on a suitable undercarriage or mold support having wheels 14 that roll along a fixed support framework having rails such as depicted at 15. Molds 11, 12 and 13 are moved along fixed rails 15 by a conveyor system such as 16. Lugs (not shown) attached to the conveyor register against the bottom of the mold undercarriage, thus causing the mold to traverse the length spanned by conveyor 16. The conveyor system 16 is preferably a roller supported sprocket driven chain; however, any similar endless belt system with appropriate mold engaging lugs would be satisfactory in order to practice the present invention. The conveyor system 16 is driven by a drive arrangement 17 that couples the conveyor system 16 with a variable speed electrical motor 18. Thus, it can be seen that molds such as 11, 12 and 13 can be moved at a variable rate of speed along the fixed rails 15 of assembly 10 by a motor means such as 18.

Mold 13 is shown with its top half 13a in closed position. Attached to the mold undercarriage of mold 13 is upright rack 19 consisting of support members 28 upon which are mounted horizontal bars 21. Bars 21 have cams 22 attached thereto in such a manner as to permit them to be positioned at any location along the entire horizontal span of bar 21. The cams which can be a simple set screw and block arrangement sliding within a channel shaped bar 21 are located quite readily at any predetermined position, which will be commented upon in more detail elsewhere. Cams 22 are held in lateral position with respect to the motion of the conveyor so that they trip switches 23 of switching unit 24. Switching unit 24 is in turn electrically connected to variable speed motor 18 and also to foam mixture dispensing unit 25 which contains constant flow rate nozzle 26. Dispensing unit 25 is depicted in block form. It represents the mixing chamber into which are fed the various foam ingredients that are combined in the proper proportions so as to produce the desired density elastomeric foam product. The details of foam mixing nozzles and the system of supplying the ingredients thereto are well-known in the art. Typical nozzle construction and feed system are shown in U.S. Patent 3,081,487.

Heretofore, it has been common practice to charge the mold with the proper amount of foam mixture by varying the rate of flow from the nozzle, or utilizing a plurality of nozzles, or timing the duration of flow from the nozzle into a given mold cavity. In the present invention the flow of foam mixture from a nozzle such as 26 is held at a fixed rate while a mold, for example, such as 12, is moved at a varying rate of speed past nozzle 26.

An ordinary mold cavity can be adequately and evenly charged with the desired quantity of foamable mixture by varying the rate of speed of the mold past nozzle 26; however, when the mold cavity is quite long and shallow the inherent mass of the mold and support mechanism prevent the attainment of a speed great enough to dispense the foamable mixture over the entire mold length in the desired time. In order to dispense the foamable mixture over the mold cavity in the required time, dispensing unit 25 and attached nozzle 26 can be moved in a direction opposite the mold. The relative speed of the mold with respect to nozzle 26 is increased, thus overcoming the inertial problem of the heavy molds. In a similar manner, an extremely deep mold cavity can be charged with the desired amount of foamable mixture by permitting the dispensing unit to travel in the same direction as the mold. The directions of motion of dispensing unit 25 are schematically shown in the drawing at 30. A showing and description of the mechanical means of achieving such movement are purposely not shown in the interest of brevity. It is sufficient to state that the movement of dispensing unit 25 can be controlled by cams 22 and accompanying conventional electrical circuitry.

Since apparatus 10 is but a part of an automated production facility, it will be understood that the molds are moved onto and taken away from conveyor system 16 by additional conveyor systems (not shown) that move with a fixed rate of speed. As a mold approaches switching unit 24, the forwardmost cam 22 trips one of switches 23, thus setting the desired rate of speed of variable speed motor 18. As conveyor 16 and, for example, mold 12 move forward at a preselected speed another cam 22 activates the flow of foamable mixture from nozzle 26. Cams 22 can be arranged along the length of bars 21 so as to select a given speed for a given lineal distance through which mold 12, or any particular cavity, travels. Mold 12 is shown with a deep cavity portion at 27, a shallow portion at 28, and another deep portion at 29. Through the positioning of cams 22 the rate of travel of mold 12 can be varied so that nozzle 26 deposits a large quantity of foamable mixture in cavity portion 27. The large quantity of foamable mixture is the direct result of the slow movement of mold 12 while it traverses the distance equivalent to the width of cavity portion 27. As shallow cavity portion 28 approaches constant flow nozzle 26, one of the prepositioned cams 22 acts on one of switches 23, thus causing an increase in the rate of travel of mold 12. As a result of the increased speed of mold 12, less foamable mixture is deposited in cavity portion 28, than was deposited in cavity portion 27. In a similar manner, the mold once again slows as cavity portion 29 begins to pass under constant flow nozzle 26, thus permitting an increased quantity of foamable mixture to be placed in 29. Cams 22 are also utilized to stop the flow of mixture from nozzle 26 as mold 12 passes beyond its range. Additional functions, such as flushing the mixing nozzle, can also be activated as cams 22 pass switches 23.

Another variation of mold design is shown within 11. Since dispensing unit 25 can move along a transverse path shown in schematic at 30, the cavities 31, 32 and 33 of mold 11 can be readily filled with the proper amount of foamable mixture. The lateral movement of dispensing unit 25 can best be controlled by cams 22 located on horizontal bars 21.

In the above detailed discussion, the actual electrical means employed to regulate the various components including the variable speed motor have been omitted since all are standard electrical systems that would be readily apparent to one skilled in the art.

This invention is particularly advantageous in that the cam arrangement of controlling the rate of travel of the conveyor system and the flow cycle of the dispensing nozzle are particular to each mold. Even in a system utilizing a timed flow, it is difficult to obtain the desired results in every instance. The present invention permits a precise measurement of volume coupled with an accurate distribution within each compartment of a given mold. Then, too, mold volumes have a tendency to vary even though of the same pattern. With the cam arrangement of controlling the speed and flow periods a very fine adjustment can be made on each mold, regardless of its design.

While certain representative embodiments and details have been shown for the purpose of illustrating the invention, it will be apparent to those skilled in this art that various changes and modifications may be made therein without departing from the spirit or scope of the invention.

I claim:
1. A method of producing a a foamed elastomeric article comprising the steps of
    (1) mixing a multipart foamable mixture in a foam dispensing unit and discharging said mixture at a constant flow rate into a mold having at least one cavity; and
    (2) moving said mold relative to said foam dispensing unit at a variable rate of speed so that the deeper mold cavities receive a greater quantity of foamable mixture than do correspondingly shallower mold cavities.
2. A method as claimed in claim 1 wherein a foamable mixture is deposited in a thicker mold cavity by a foam dispensing unit that is traveling in the same direction as said mold.
3. A method as claimed in claim 1 wherein a foamable mixture is deposited in a thinner mold cavity by a foam dispensing unit that is traveling in a direction opposite the direction of said mold.
4. An apparatus for producing a foamed article of different thicknesses comprising a conveyor framework assembly having trained thereover conveyor means that engages and propels mold support means containing as a part thereof switch activating means which in turn coacts with a switching unit mounted as an attached part of said conveyor framework, said switching unit electrically coupled with said conveyor means and controlling the linear rate of movement of said conveyor means and the flow from a foamable mixture dispensing unit mounted in close proximity with respect to said conveyor means.
5. In a polyurethane foam producing apparatus the improvement comprising a rigid conveyor framework assembly having a variable speed conveyor means mounted therein that propels a plurality of mold support means over said framework, each of said support carrying a mold containing at least one cavity and a switch activating means, mounted on said mold support means, that extends over a portion of the length of said mold, said switch activating means coacting with a switching unit mounted as an integral part of said conveyor framework and which in turn is electrically coupled with said conveyor means and with a foamable mixture dispensing unit so as to control the linear rate of movement between said unit and said conveyor means and to control the flow from said unit mounted in close proximity with respect to said molds.
6. In a flexible polyurethane foam cushion producing apparatus the improvement comprising a rigid conveyor framework assembly having a track thereon for the movement of mold support means, a variable speed conveyor means supported by said framework assembly and mounted in parallel relationship with respect to said track to propel said mold support means along said track, each of said support means carrying a mold containing at least one cavity and having mounted thereon switch activating means formed from a plurality of parallel bars each containing at least one switch activating cam, said switch activating means extending over approximately the length of the mold, a switching unit containing thereon switches held in position so as to coact with said switch activating means which in turn is electrically coupled with said conveyor means and with a foamable mixture dispensing unit so as to control the linear rate of movement of said conveyor means, and also to control the on and off positions of a dispensing unit that emits a foamable mixture at a constant flow rate.
7. In an apparatus for producing a substantially uniform density foamed article having sections that vary in thickness, the improvement comprising a structural conveyor framework assembly having a plurality of tracks supported thereon for the transportation of mold support means thereover, a conveyor means coupled with a variable speed electric motor and supported by said framework assembly in parallel relationship with respect to said tracks, said conveyor means equipped with mold engaging means for engaging the mold support means and propelling the same along said tracks, said mold support means carrying a mold with at least one cavity therein and switch activaitng means extending substantially over the length of the mold support means, said switch activating means formed from a plurality of bars, each containing at least one switch activating cam that can be set at locations along said bar to co-act with a switching unit mounted on said framework assembly, said switching unit being in turn electrically coupled with a constant flow foamable mixture dispensing unit so as to start and stop the flow of foamable mixture into said mold and said switching unit also electrically coupled with said electric motor to regulate the speed of said mold as the cavities of varying thickness pass beneath said dispensing unit mounted to the structural conveyor framework assembly.

8. An apparatus as claimed in claim 7 wherein said dispensing unit is activated by said switch activating cam so that it will move laterally with respect to the direction of travel of said conveyor.

9. An apparatus as claimed in claim 8 wherein said dispensing unit is activated by said switch activating cam so that it will move in a direction parallel to the direction of motion of the molds.

References Cited by the Examiner

UNITED STATES PATENTS

| | | | |
|---|---|---|---|
| 2,718,033 | 9/1955 | Burke | 264—45 |
| 3,046,177 | 7/1962 | Hankins | 264—47 |
| 3,081,487 | 3/1963 | Heffner et al. | 264—54 XR |
| 3,111,365 | 11/1963 | Hood et al. | 264—54 |

FOREIGN PATENTS

| | | |
|---|---|---|
| 57,881 | 9/1953 | France. |
| 49,340 | 9/1931 | Norway. |

ALEXANDER H. BRODMERKEL, *Primary Examiner.*

UNITED STATES PATENT OFFICE
CERTIFICATE OF CORRECTION

Patent No. 3,247,295                      April 19, 1966

Jerome E. Burwell

It is hereby certified that error appears in the above numbered patent requiring correction and that the said Letters Patent should read as corrected below.

Column 2, line 27, for "28" read -- 20 --; column 4, line 36, after "support" insert -- means --.

Signed and sealed this 2nd day of January 1968.

(SEAL)
Attest:

Edward M. Fletcher, Jr.                      EDWARD J. BRENNER

Attesting Officer                            Commissioner of Patents